(12) United States Patent
Galbreath et al.

(10) Patent No.: US 10,676,000 B2
(45) Date of Patent: Jun. 9, 2020

(54) LAYERED SEATING SYSTEM WITH ATTACHMENTS

(71) Applicant: Lear Corporation, Southfield, MI (US)

(72) Inventors: Ashford A. Galbreath, Troy, MI (US); Thomas S. Hicks, Livonia, MI (US); Ronald L. Miotto, Redford, MI (US); Asad S. Ali, Troy, MI (US); Mark A. Folkert, Farmington Hills, MI (US); William Paruszkiewicz, Clinton Township, MI (US); Paul Severinski, Brownstown, MI (US); James B. Clauser, Oakland Township, MI (US); Thomas A. Welch, Sr., Ortonville, MI (US)

(73) Assignee: Lear Corporation, Southfield, MI (US)

( * ) Notice: Subject to any disclaimer, the term of this patent is extended or adjusted under 35 U.S.C. 154(b) by 539 days.

(21) Appl. No.: 15/399,280

(22) Filed: Jan. 5, 2017

(65) Prior Publication Data

US 2017/0113586 A1 Apr. 27, 2017

Related U.S. Application Data

(62) Division of application No. 12/469,204, filed on May 20, 2009, now Pat. No. 9,555,728.

(Continued)

(51) Int. Cl.
*B60N 2/58* (2006.01)
*A01K 1/02* (2006.01)
(Continued)

(52) U.S. Cl.
CPC .......... *B60N 2/5825* (2013.01); *A01K 1/0272* (2013.01); *B60N 2/28* (2013.01);
(Continued)

(58) Field of Classification Search
CPC ........ B60N 2/5825; B60N 2/28; B60N 2/286; B60N 2/287; B60N 3/00
(Continued)

(56) References Cited

U.S. PATENT DOCUMENTS 3,574,401 A 4/1971 Lehner
4,789,201 A 12/1988 Selbert
(Continued)

FOREIGN PATENT DOCUMENTS

CN 1070094 A 3/1993
CN 1107788 A 9/1995
(Continued)

OTHER PUBLICATIONS

Chinese Office Action CN 201510611461.7 dated Feb. 3, 2017; 9 pages.
(Continued)

*Primary Examiner* — Anthony D Barfield
(74) *Attorney, Agent, or Firm* — Brooks Kushman P.C.

(57) ABSTRACT

A vehicle seat assembly is provided with a structural member adapted to be mounted within a vehicle to provide support to an occupant. The structural member has at least one channel formed therein. A cushion member is provided adjacent to the structural layer. The cushion member has at least one channel formed therethrough. A trim member is secured over the cushion member to form a seating surface. At least one attachment member is mounted to the trim member extending through the at least one channel of the cushion member. The at least one attachment member extends into the at least one channel of the structural member such that at least one of the trim material and the cushion layer is retained on the structural member.

20 Claims, 11 Drawing Sheets

Related U.S. Application Data

(60) Provisional application No. 61/058,516, filed on Jun. 3, 2008.

(51) Int. Cl.
*B60N 2/28* (2006.01)
*B60N 3/00* (2006.01)

(52) U.S. Cl.
CPC ......... *B60N 2/2866* (2013.01); *B60N 2/2887* (2013.01); *B60N 3/00* (2013.01); *B60N 2205/30* (2013.01)

(58) Field of Classification Search
USPC ............... 297/440.22, 452.26, 452.27, 452.6
See application file for complete search history.

(56) References Cited

U.S. PATENT DOCUMENTS

| | | | |
|---|---|---|---|
| 5,017,413 A | 5/1991 | Moschini | |
| 5,176,424 A | 1/1993 | Tobita et al. | |
| 5,283,918 A | 2/1994 | Weingartner et al. | |
| 5,564,144 A | 10/1996 | Weingartner et al. | |
| 5,568,959 A | 10/1996 | Weber et al. | |
| 5,713,629 A | 2/1998 | Plackis | |
| 5,733,001 A | 3/1998 | Roberts | |
| 5,827,547 A | 10/1998 | Burchi et al. | |
| 6,299,255 B1 | 10/2001 | Pichon | |
| 7,213,879 B2 | 5/2007 | Oto | |
| 7,481,489 B2 * | 1/2009 | Demick | B60N 2/5825 297/218.1 |
| 7,946,649 B2 | 5/2011 | Galbreath et al. | |
| 2007/0188007 A1 | 8/2007 | Lazanja et al. | |
| 2009/0033131 A1 | 2/2009 | Clauser et al. | |

FOREIGN PATENT DOCUMENTS

| | | |
|---|---|---|
| DE | 3723454 A1 | 1/1988 |
| DE | 4219656 C1 | 12/1992 |
| DE | 4137599 A1 | 5/1993 |
| DE | 4219657 A1 | 12/1993 |
| DE | 10108318 A1 | 9/2002 |
| DE | 10116696 C1 | 9/2002 |
| DE | 69621277 T2 | 9/2002 |
| DE | 10119807 A1 | 10/2002 |
| DE | 10120621 A1 | 11/2002 |
| DE | 102004050779 A1 | 4/2006 |
| DE | 102004053133 A1 | 5/2006 |
| DE | 102006019740 A1 | 11/2007 |
| FR | 2814709 A1 | 4/2002 |
| FR | 2884772 A1 | 10/2006 |
| FR | 2887825 A1 | 1/2007 |
| JP | H11240363 A | 9/1999 |
| WO | 00/71382 A1 | 11/2000 |

OTHER PUBLICATIONS

German Office Action DE 10 200900230586.8; dated Jan. 30, 2015; 7 pages.

* cited by examiner

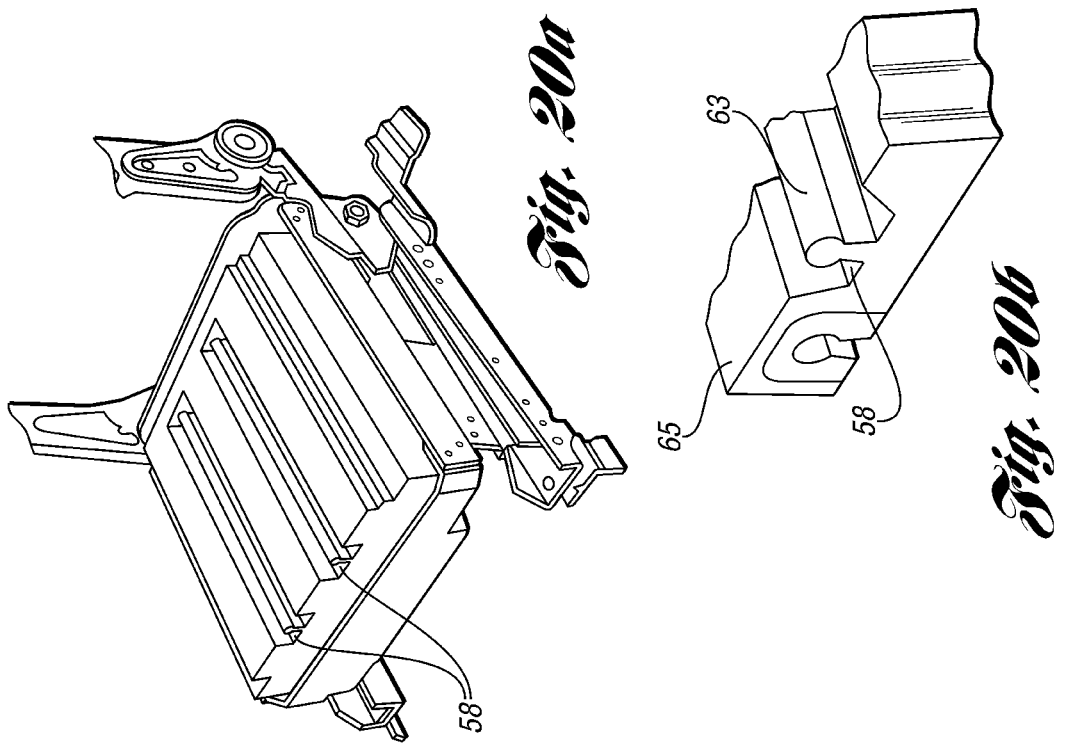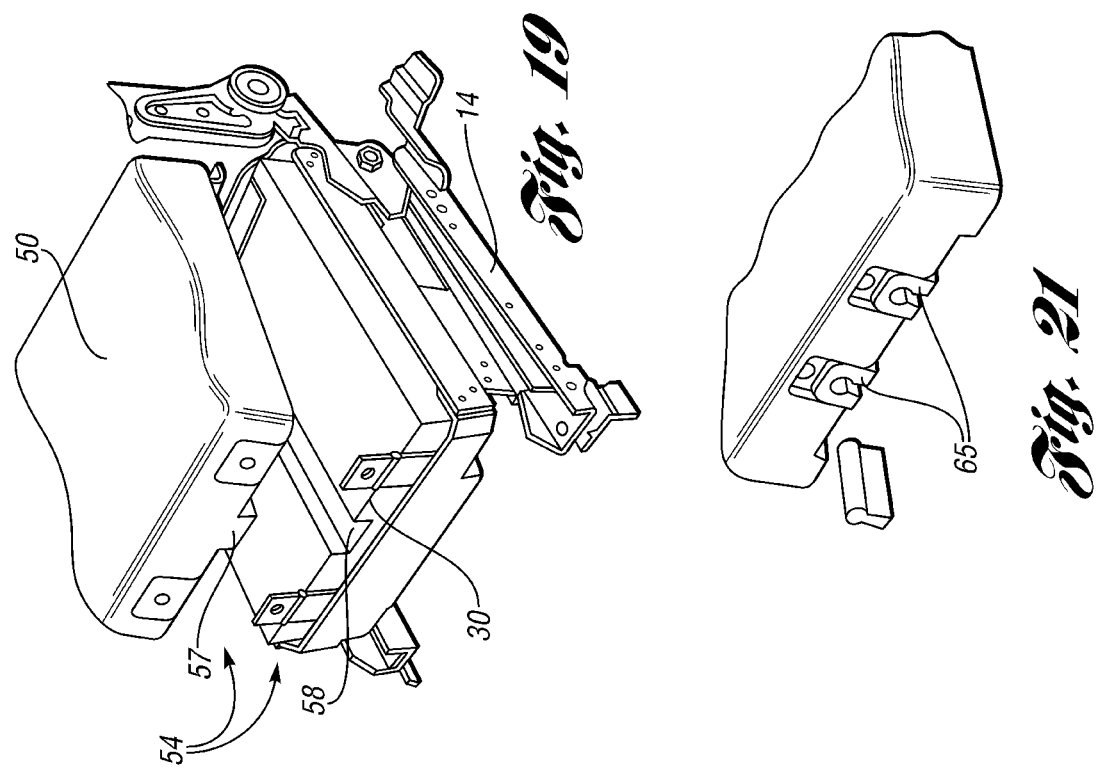

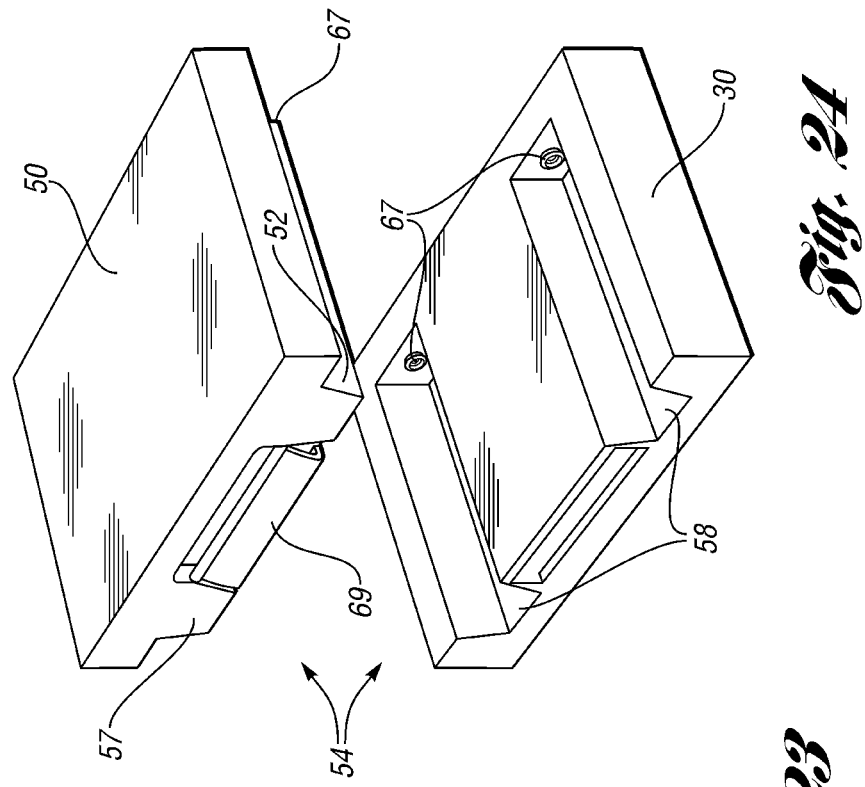
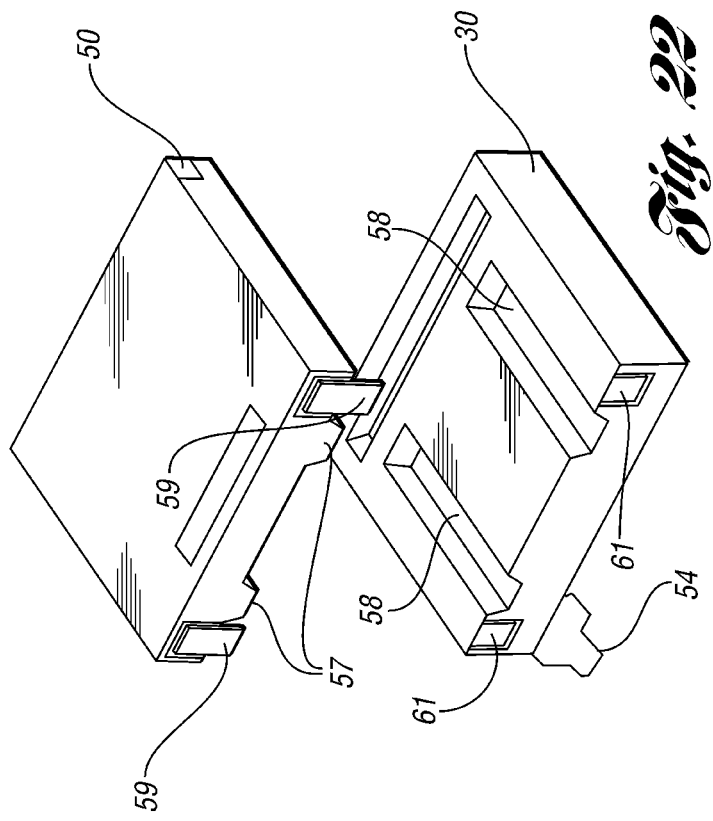
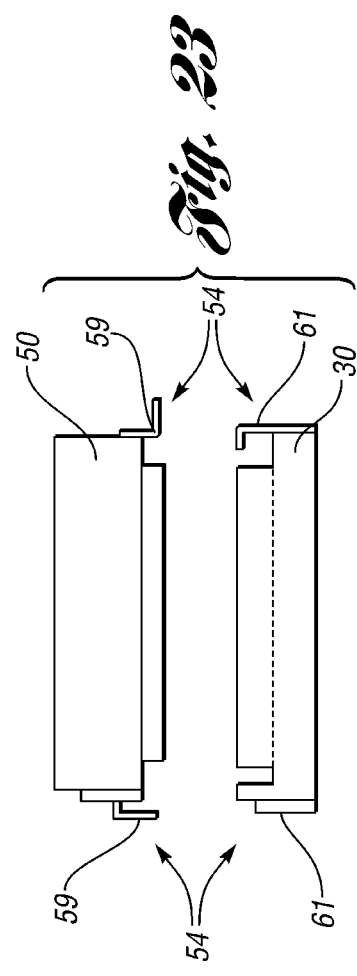

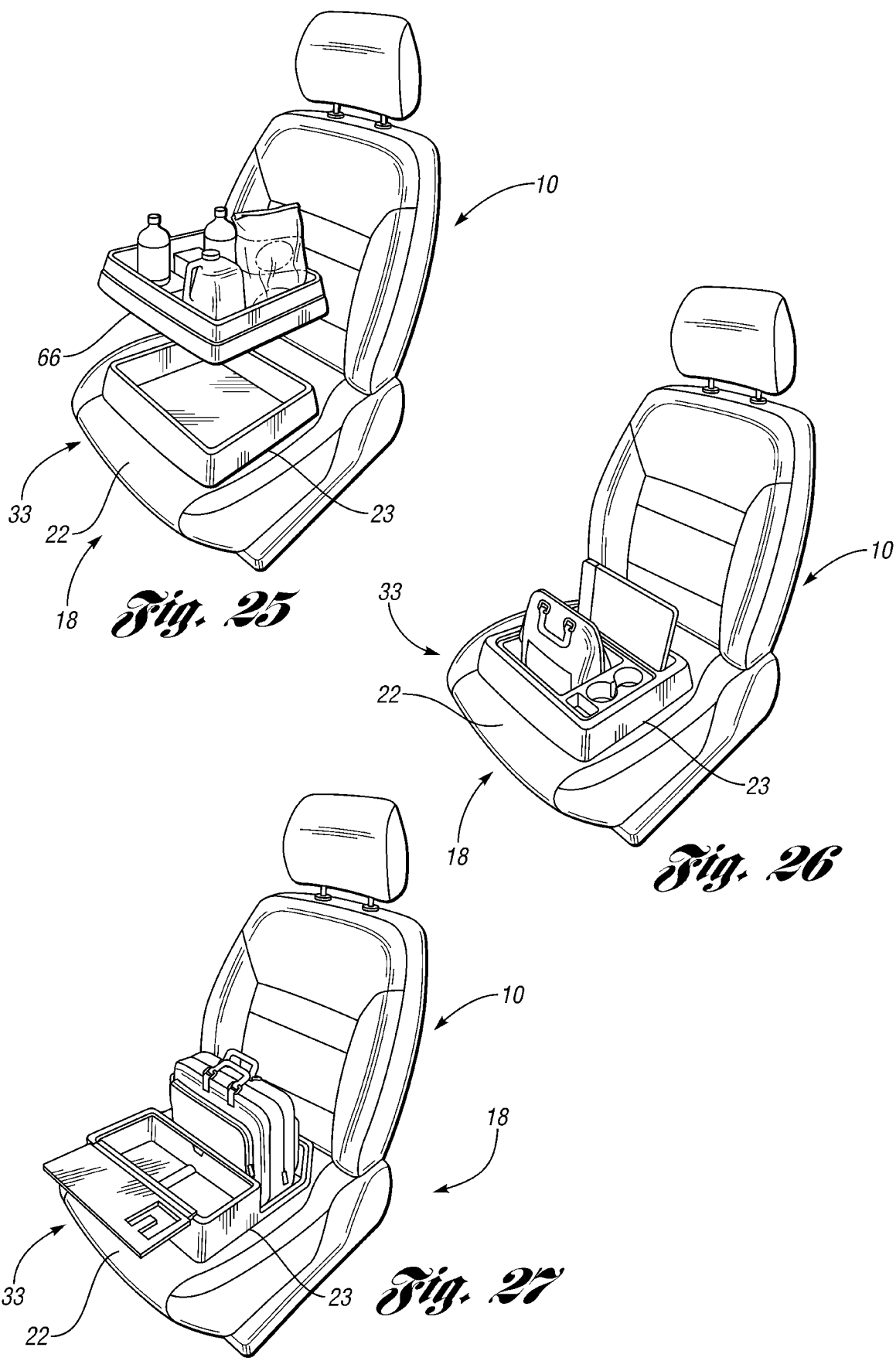

LAYERED SEATING SYSTEM WITH ATTACHMENTS

CROSS-REFERENCE TO RELATED APPLICATIONS

This application is a division of U.S. application Ser. No. 12/469,204 now U.S. Pat. No. 9,555,728 filed May 20, 2009, which in turn claims the benefit of U.S. provisional application Ser. No. 61/058,516 filed Jun. 3, 2008, the disclosures of which are incorporated herein by reference.

TECHNICAL FIELD

Embodiments of the present invention relate to a layered seating system.

BACKGROUND

Most seat assemblies include three fundamental components: (a) a frame to support the seat assembly and mount it to a body, such as a vehicle; (b) a foam cushion to cover the frame; and (c) trim material to cover the foam cushion and provide a durable surface for contact with a seat assembly occupant. A conventional vehicle seat design typically involves the mixing of base construction polymers joined in a manner that is difficult to disassemble and not focused on environmentally friendly material use.

BRIEF DESCRIPTION OF THE DRAWINGS

FIG. 19 is a schematic view of a portion of the seat assembly in accordance with an embodiment of the present invention;

FIG. 20a is a schematic view of a portion of the seat assembly in accordance with an embodiment of the present invention;

FIG. 20b is an enlarged view of a portion of FIG. 20a;

FIG. 21 is a schematic view of a portion of the seat assembly in accordance with an embodiment of the present invention;

FIG. 22 is a schematic view of a portion of the seat assembly in accordance with an embodiment of the present invention;

FIG. 23 is a cross-sectional view of the portion of the seat of FIG. 22;

FIG. 24 is a schematic view of a portion of the seat assembly in accordance with an embodiment of the present invention;

FIG. 25 is a partially exploded schematic view of a seat assembly in accordance with another embodiment of the present invention;

FIG. 26 is a schematic view of a seat assembly in accordance with another embodiment of the present invention;

FIG. 27 is another schematic view of a seat assembly in accordance with yet another embodiment of the present invention;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Moreover, except where otherwise expressly indicated, all numerical quantities in the description are to be enlisted as modified by the word "about" in describing the broader scope of the invention. Practice within the numerical limit stated is generally preferred. Also, unless expressly stated to the contrary, the description of a group or class of materials is suitable or preferred for a given purpose in connection with the invention implies that mixtures of any two or more members of this group or class may be equally suitable or preferred.

Figure 1:
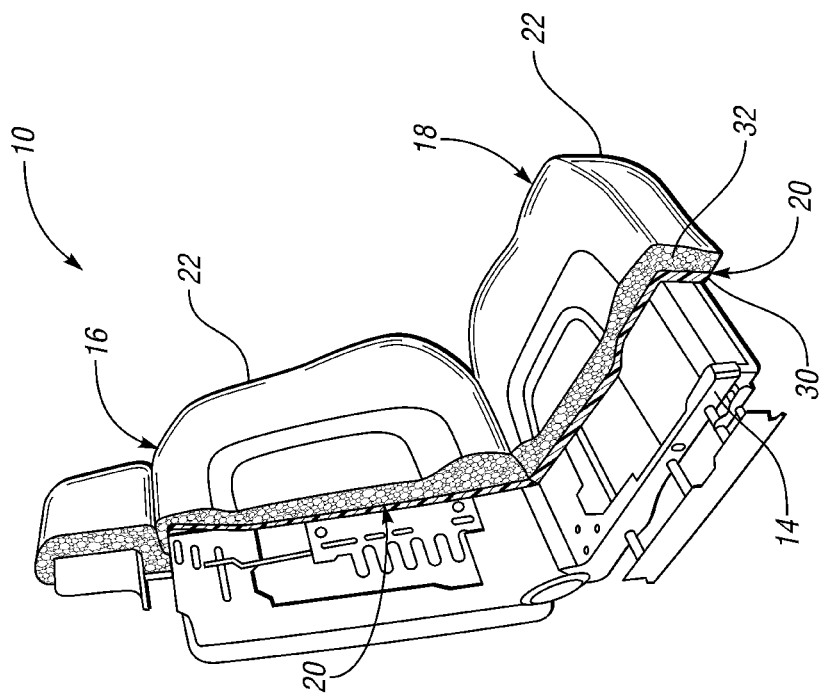
FIG. 1 is a schematic cut-away environmental view of a vehicle seat assembly in accordance with an embodiment of the present invention.

Referring to FIG. 1, a vehicle seat assembly 10 is illustrated. While the vehicle seat assembly 10 is illustrated in FIG. 1 to be a bucket seat assembly, it should be understood that the principles of the invention are applicable to other types of seat assemblies, such as bench, captain and other types of seat assemblies. It should also be understood that the principles of the present invention are applicable to other configurations where foam is a component, such as backrests, back support pads, armrests, and head restraints. Still further, it should be understood that the principles of this invention are applicable to all types of vehicle seat assemblies as well as non-vehicle seat assemblies.

As shown in FIG. 1, the vehicle seat assembly 10 includes a seat frame, generally indicated at 14 having a plurality of mounting brackets (not shown) adapted to operatively secure the seat frame 14 within a vehicle (not shown). The seat frame 14 may be constructed from any materials suitable for application within a vehicle seat assembly 10, such as aluminum, steel or other metal alloy, composite material, or a suitable polymer. Further, the seat frame 14 may be manufactured using techniques commonly known in the art, and relative to the type of material employed. By way of example, the manufacturing techniques may include stamping, welding, fastening or molding a suitable material to form the seat frame 14.

The vehicle seat assembly 10 also includes a seat back, generally indicated at 16 and a lower seat assembly, generally indicated at 18. In at least the illustrated embodiment, the seat back 16 and the lower seat assembly 18 each have the same cushion composite 20 covered by a trim material 22. However, it should be understood that the configuration of the cushion composite 20 for the seat back 16 can differ from the configuration of the cushion composite 20 of the lower seat assembly 18. Likewise, it should be understood that the trim material 22 for the seat back 16 can differ from the trim material for the lower seat assembly 18. As can be seen in FIG. 1, the cushion composite 20 includes a structural member 30, in at least the illustrated embodiments, disposed over frame 14 and a cushion layer 32 that is disposed over the structural member 30. The cushion composite 20 could include other optional layers such as a comfort pad. As will be explained further below, each of the layers cooperate with and in some embodiments are secured to each other in a manner such that they are relatively easily separable for recycling at end of use.

The structural member 30 can be any suitable structural foam material. In at least one embodiment, suitable structural materials will have a rigidity and/or density that is higher than conventional polyurethane foam. In at least one embodiment, suitable structural foam materials have a density of at least 1.75 pounds per cubic foot (pcf), and less than 7.0 pcf. In at least another embodiment, the suitable structural foam materials will have a density of 2.0 to 4.0 pcf, and in yet other embodiments of 2.5 to 3.5 pcf. Density of the structural foam material can be measured in accordance with ASTM test method No. D3574.

In at least one embodiment, suitable structural materials will have a hardness of 150 to 250 N (Newtons), in at least another embodiment of 175 to 230 N, and in at least another embodiment of 190 to 215 N. Hardness can be measured by ASTM test method No. D3574 and at 25% compression or deflection. In at least one embodiment, suitable structural materials will have a compression strength of 20 to 100 psi, in at least another embodiment of 30 to 80, and in at least another embodiment of 35 to 65, as measured in accordance with ASTM test method No. D3574.

In at least one embodiment, the structural member 30 comprises a molded expanded polyolefin (EPO) layer. Suitable examples of expanded polyolefin (EPO) include, but are not necessarily limited to, expanded polyethylene (EPE), expanded polypropylene (EPP), expanded polybutylene (EPB), and copolymers of ethylene, propylene, butylene, 1,3-butadiene, and other olefin monomers, such as alpha-olefin monomers having from 5-18 carbon atoms, and/or cycloalkylene monomers such as cyclohexane, cyclopentene, cyclohexadiene, norbornene, and aromatic substituted olefins, such as styrene, alpha-methylstyrene, paramethylstyrene, and the like.

The EPO may be expanded polypropylene (EPP) and its copolymers with ethylene, propylene and butylene. Any suitable EPP may be used, however in at least one embodiment, suitable EPP's include, but are not limited to, ARPRO® EPP available from JSP International.

Expanded polyolefins can be prepared by a bead polymerization process in which relatively small uniform beads of polymer are expanded during a reaction process. The expanded beads are then molded into shapes by applying steam heat, which causes the expanded beads to adhere.

While the structural member 30 can have any suitable size and configuration, in at least one embodiment, the structural member 30 has an average thickness of 5 to 100 mm, in other embodiments of 20 to 70 mm, and in yet other embodiments of 30 to 50 mm.

The cushion layer 32 can comprise any suitable cushion material, such as a suitable resilient polymer. In at least one embodiment, suitable cushion materials will have a density of 1.5 to 4.5 pcf, in another embodiment of 2.0 to 3.75 pcf, and in yet other embodiments of 2.7 to 3.0 pcf. Density of the cushion material can be measured by ASTM test method No. D3574. In at least one embodiment, suitable cushion materials will have a hardness of 175 N (Newtons) to 400 N, in other embodiments of 225 to 350 N, and in yet other embodiments of 275 to 325 N. Hardness of the cushion material can be measured by ASTM test method No. D3574. In at least one embodiment, suitable cushion materials will have a hysteresis of 18 to 30 KPa, in another embodiments of 20 to 28 KPa, and in yet other embodiments of 23-26 KPa. Hysteresis of the cushion material can be measured by ASTM test method No. D3574.

In at least certain embodiments, the cushion material comprises conventional polyurethane foam, soy-based foam, silicone, thermoplastic olefins, thermoplastic urethanes, and/or natural oil-based expanded polyurethanes and the like. In at least one embodiment, because of its environmentally friendly nature, soy-based polyurethane is preferred. Soy-based polyurethane can be made with any suitable soy-based polyols, such as those available, but not necessarily limited to, from Bayer and Urethane Soy Systems. Any suitable soy-based polyurethane may be used, however in at least one embodiment, suitable soy-based polyurethanes include, but are not necessarily limited to, those available from Woodbridge Foam and Renosol. The cushion layer 32 can be any suitable size and shape, however, in at least one embodiment, the cushion layer 32 has an average thickness of 20 to 100 mm, and in at least another embodiment of 30 to 70 mm, and in still yet other embodiments of 40 to 60 mm.

As discussed, the vehicle seat assembly 10 also includes trim material 22 which is adapted to engage the cushion composite 20 in a covering relationship. The trim material 22 may include any material known in the art. By way of example, some of the known materials include cloth, leather or polymers of sufficient quality and thickness for use in seat trim applications. Polymer trim materials may include a flexible close cell polymer skin material such as polyvinyl, polyvinyl chloride (PVC), polyester, nylon, thermoplastic olefin (TPO) or thermoplastic urethane (TPU). Additional materials for use as trim material 22, may include a foam backing (not shown, but generally known in the art) which may be manufactured from a variety of polymer foam materials. By way of example, the foam backing may be polyethylene, polypropylene, polyurethane, or a polystyrene foam. Optionally, a mesh or reinforcing material (not shown, but generally known in the art) such as fiberglass, nylon, polyester or natural fibers may be applied to the foam backing or back of the trim material 22 for increase in strength without increasing rigidity. In at least one particularly preferred embodiment, the trim material 22 comprises polyester or nylon trim material having polyester or nylon trim fasteners (not shown) for securing the trim material 22 to one or more components (i.e., cushion 20 and/or frame 14) of the vehicle seat assembly 10.

A plurality of embodiments of the vehicle seat assembly 10 are further described and illustrated in U.S. Provisional Patent Application No. 60/997,052 filed on Oct. 1, 2007 by Galbreath et al. which is incorporated by reference herein.

Figure 2:
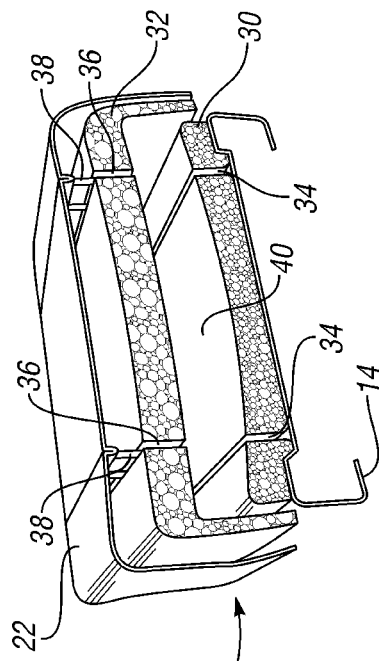
FIG. 2 is an exploded cross-sectional perspective view of a portion of a seat assembly in accordance with an embodiment of the present invention.

An embodiment of the lower seat assembly 18 of FIG. 1 is illustrated in FIG. 2. The lower seat assembly 18 has a structural member 30 that is supported by the frame 14 of the vehicle seat (not shown). The structural member 30 is provided to support the cushion layer 32. The cushion layer 32 supports trim material 22 that provides a surface for an occupant to sit upon and/or place object on. As discussed further below, the trim layer 22 may be able to be readily changed out for customization or to conform to a particular occupant.

As illustrated, the structural member 30 has embedded attachment members 34 which correspond to channels 36 provided through the cushion layer 32 and fastening members 38. To assemble the lower seat assembly 18, the fastening members 38 are attached to the trim 22, inserted through the channel 36 formed in the cushion layer 32 and are inserted into the attachment members 34 of the structural member 30. In the depicted embodiment, two sets of attachment members 34, channels 36 and fastening members 38 are utilized to stabilize the lower seat assembly 18. Any suitable amount of attachment members 34, channels 36 and fastening members 38 may be utilized.

In at least one embodiment, the embedded attachment members 34 can be embedded within the structural member 30 in any suitable manner. For instance, the attachment members 34 could be press fit within the structural member 30 or can be molded into the structural member 30 during the molding of the structural member 30. Also, the attachment members 34 could be adhered or otherwise secured to the structural member 30. As shown in FIG. 2, the attachment members 34 are molded within the structural member 30 and are sized to receive each of the fastening members 38 in each of the attachment members 34. Of course, any suitable attachment member 34 that is connectable with the fastening member 38 is contemplated within the scope of the present invention.

Figure 14:
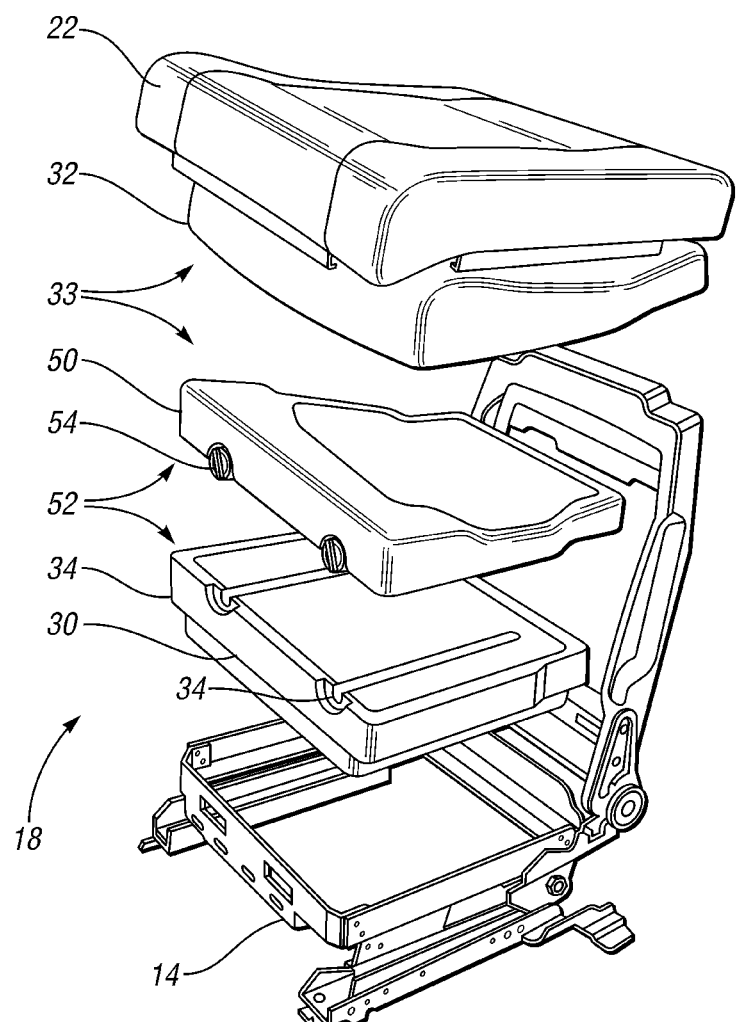
FIG. 14 is an exploded schematic view of a portion of a vehicle seat assembly in accordance with an embodiment of the present invention.

In the depicted embodiment, the fastening members 38 are clips 38 that have a Christmas tree type design so that the clips can be readily inserted into the attachment members 34 and retained therein. The fastening members 38 are used to secure the trim material 22 to the structural member 30. The fastening members 38 can be molded or sewn to, or otherwise attached to, the trim material 22 and/or the cushion layer 32 at desired location for securing the trim to the seat assembly. The fastening members 38 can then be secured to the attachment members 34 to secure the trim material 22 and/or the comfort layer 32 to the structural layer and thus the seat assembly. In at least one embodiment, the fastening members 38 are connected to an insert region 33, which is illustrated in FIG. 14. Of course, any suitable fastening member 38 is contemplated within the scope of the present invention.

Figure 3:
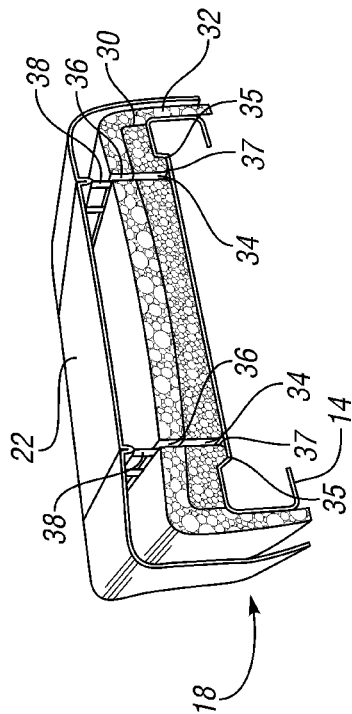
FIG. 3 is a partially assembled cross-sectional perspective view of another embodiment of a portion of a seat assembly.
Figure 4:
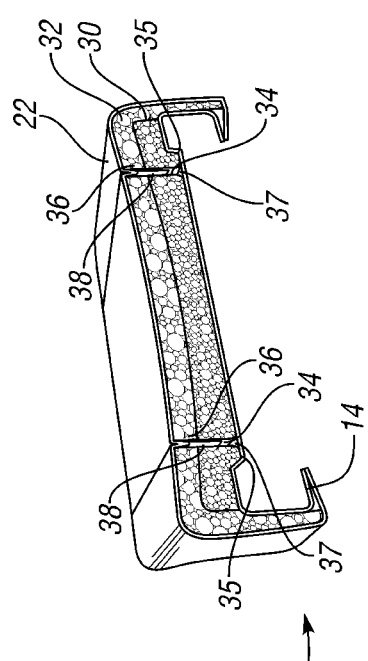
FIG. 4 is a fully assembled cross-sectional perspective view of the portion of a seat assembly of FIG. 3.

With reference now to FIG. 3, another embodiment of the lower seat assembly 18 is illustrated partially assembled. The trim layer 22 is illustrated removed from the structural member 30 and the cushion layer 32. In FIG. 4, the lowering seating assembly 18 is assembled with the trim layer 22 attached to the structural member 30 and the cushion layer 32.

As illustrated in FIGS. 3 and 4, the attachment member 34 has a channel 35 formed through the structural member 30 and an abutment edge 37 provided adjacent the channel 35. When the fastening members 38 are inserted through the channel 36 of the cushion layer 32, the attachment member 34 is inserted through the channel 35 of the attachment member 34 and is consequently retained by the abutment edge 37, as seen in FIG. 4. Although the attachment member 34 is illustrated having a channel 35 and an abutment edge 37, any suitable attachment member 34 is contemplated within the scope of the present invention.

Figure 5:
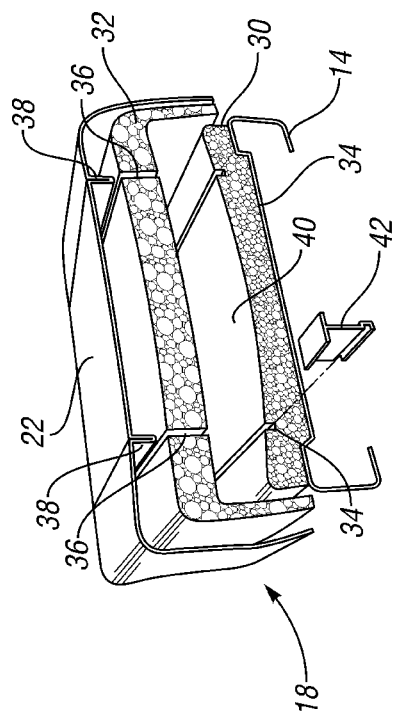
FIG. 5 is an exploded cross-sectional perspective view of a portion of a seat assembly in accordance with another embodiment of the present invention.

Referring now to FIG. 5, still another embodiment of the lower seat assembly 18 is illustrated. In at least one embodiment, the trim layer 22 is slid into the structural member 30 and the cushion layer 32, rather than inserted. In the depicted embodiment, the attachment member 34 is a channel 34 formed in an upper surface 40 of the structural member 30. The channel 34 can be continuous along the entire upper surface 40 of the structural member 30. A locking member 42 is provided to lock the fastening member 38 into the attachment member 34 to further retain the trim layer 22 on the structural member 30 and the cushion layer 32. In the illustrated embodiment, the locking member 42 is sized to be received within both the channel 34 and the fastening member 38. Any suitable size and shape for the locking member 42 that fits within the channel 34 and the fastening member 38 is contemplated within the scope of the present invention. Additionally, any suitable size and shape for the fastening member 38 and channel 34 is contemplated within the scope of the present invention. In at least one embodiment, a locking member 42 is utilized when an insert region 33 is employed, as shown in FIG. 14.

Figure 6:
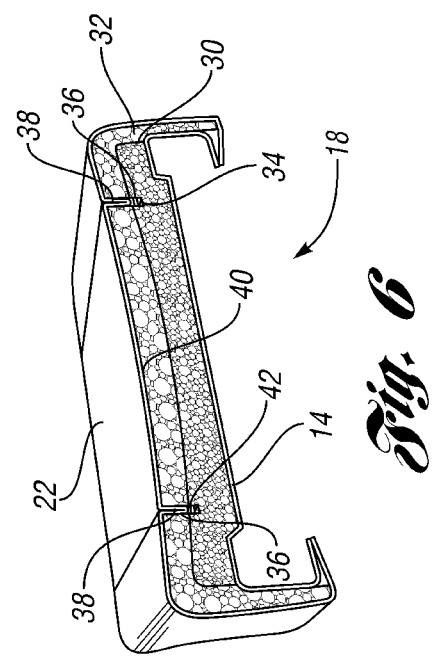
FIG. 6 is a partially assembled cross-sectional perspective view of the portion of a seat assembly of FIG. 5.

To assemble the lower seat assembly 18 of FIG. 5, the cushion layer 32 is mounted on the structural member 30 so that the channels 36 formed in the cushion layer 32 align with the channels 34 of the structural member 30. The trim layer 18 is inserted or slid into the structural member 30 and the cushion layer 32. The locking member 42 is inserted into the channel 34 and the fastening member 38 to secure the trim layer 22 to the structural member 30. The assembled lower seat assembly 18 is illustrated in FIG. 6. The locking member 42 can be removed as desired to change the trim layer 22 and/or add the insert region 33 of FIG. 14.

Figure 7:
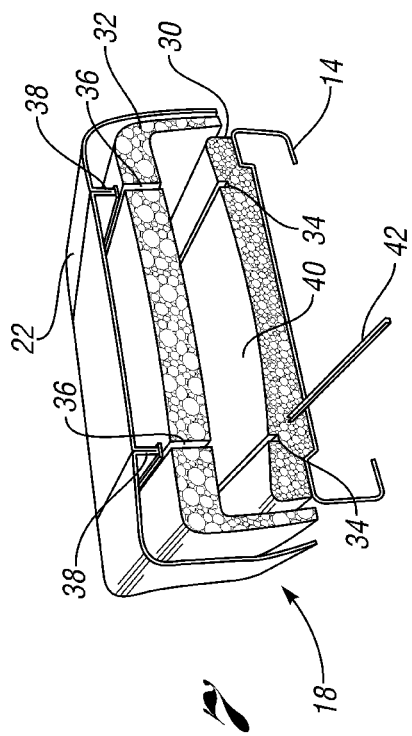
FIG. 7 is an exploded cross-sectional perspective view of a portion of a seat assembly in accordance with another embodiment of the present invention.
Figure 8A:
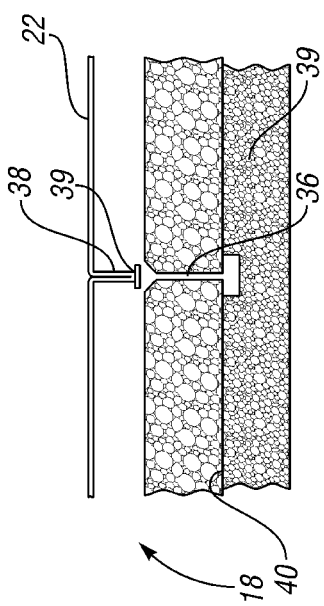
FIG. 8a is a cross sectional view of the portion of the seat assembly of FIG. 7.
Figure 8B:
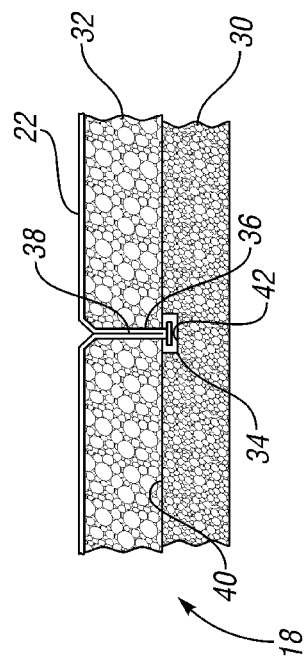
FIG. 8b is an assembled cross sectional view of FIG. 8b.

In FIGS. 7 and 8a, another embodiment of the lower seat assembly 18 is illustrated disassembled. In FIG. 8b, the lower seat assembly 18 of FIGS. 7 and 8a is depicted assembled. As shown in FIG. 7, a locking rod 42 is provided to fit within the channel 34 and the fastening member 38 to secure the trim layer 22 to the structural member 30. The channel 34 is sized to receive both the fastening member 38 and the locking rod 42 therein. The fastening member 38 may have an aperture 39, illustrated in FIG. 8a, that is sized to receive the locking rod 42 therein.

To assemble the lower seat assembly 18 of FIGS. 7 and 8a, the cushion layer 32 is mounted on the structural member 30 so that the channels 36 formed in the cushion layer 32 align with the channels 34 of the structural member 30. The trim layer 18 slid into the structural member 30. The locking rod 42 is inserted into the aperture 39 of the fastening member 38 located in the channel 34 to secure the trim layer 22 to the structural member 30. The assembled lower seat assembly 18 is illustrated in FIG. 8b. The locking rod 42 can be removed as desired to change the trim layer 22 and/or add the insert region 33 of FIG. 14.

Figure 9:
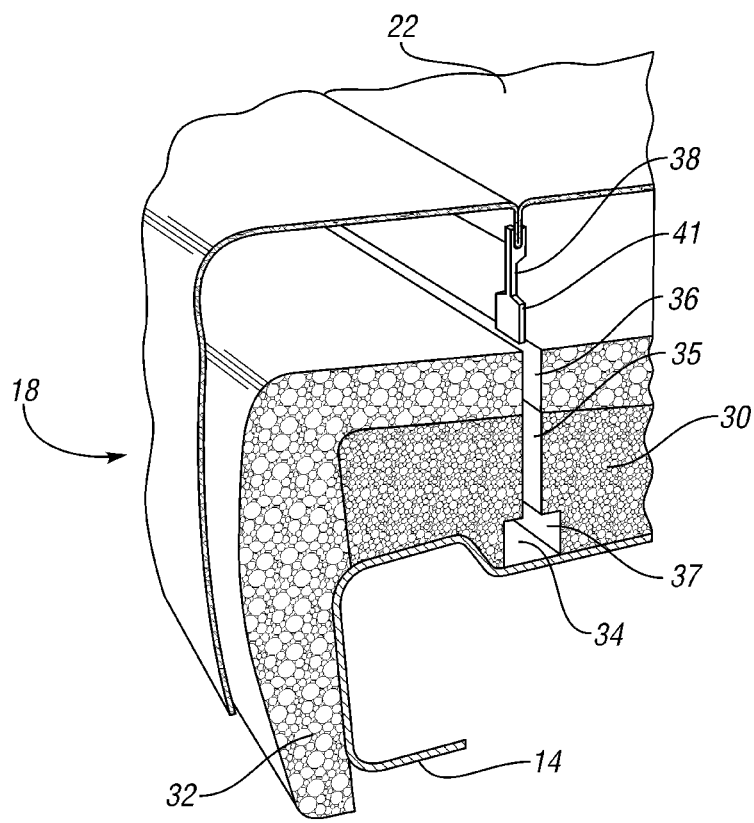
FIG. 9 is a cross-sectional perspective view of a portion of a seat assembly in accordance with another embodiment of the present invention.

Referring now to FIG. 9, another embodiment of the lower seat assembly 18 is illustrated. In the present embodiment, the attachment member 34 is a channel 35 and an abutment area 37. The channel 35 is formed through the structural member 30 and the abutment area 37 is formed within the structural member 30 proximate the channel 35. As shown, the fastening member 38 is a paddle 38 that is attached to the trim layer 22. The paddle 38 can be inserted through the channel 36 in the cushion layer 32, through the channel 35 in the structural member 30 so that at least a portion of the paddle 38 is past the abutment area 37. The paddle 38 has a blade member 41 that can cooperate with the abutment area 37 so that once the paddle 38 has been inserted into the structural member 30, the paddle 38 can be rotated so that the blade member 41 can no longer fit through the channel 35 in the structural member 30 or the channel 36 in the cushion layer 32.

If the trim layer 22 is lifted relative to the structural member 30, the blade member 41 of the paddle 38 abuts against the abutment area 37 so that the trim layer 22 remains relatively flush against the cushion layer 32. The paddle 38 can be rotated so that the blade 41 does not abut against the abutment area 37 to allow the trim layer 22 to be removed. Of course, the paddle 38 can be employed with the insert region 33 (shown in FIG. 14) to secure the insert region 33 to the structural member 30.

Figure 10:
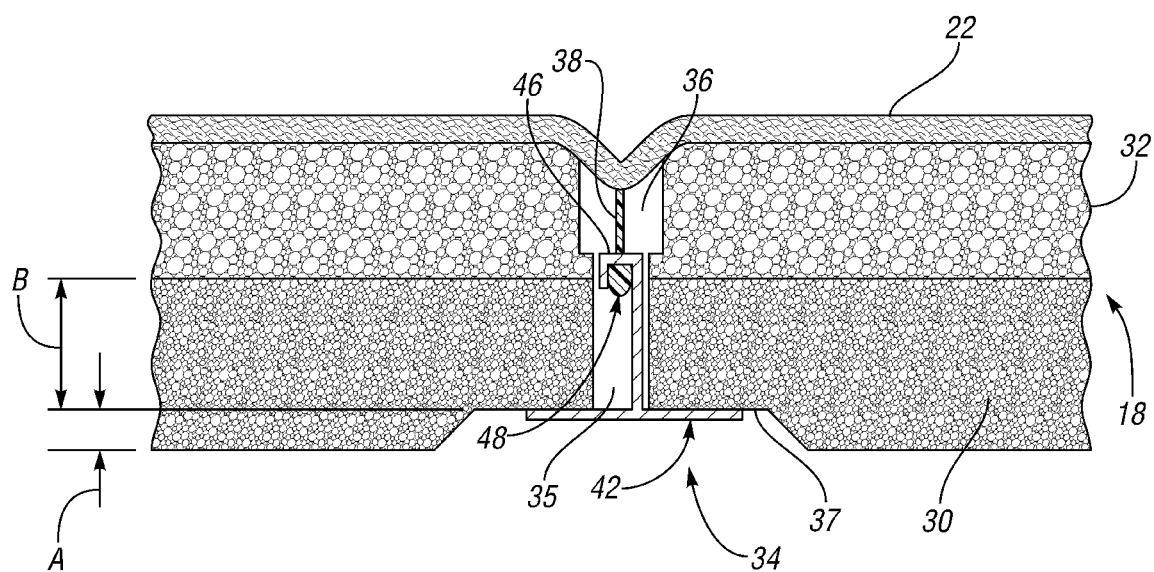
FIG. 10 is a cross-sectional perspective view of a portion of a seat assembly in accordance with another embodiment of the present invention.

In FIG. 10, still another embodiment of the lower seat assembly 18 is illustrated. The structural member 30 may have a channel 35 to receive at least a portion of the fastening member 38. The structural member 30 may also have an abutment area 37 that is recessed within the structural member 30 and sized to receive a locking clip 42 therein. The locking clip 42 interacts with the fastening member 38 to secure the fastening member 38 and the trim layer 22 to the structural member 30. A cushion layer 32 is provided between the trim layer 22 and the structural member 30, as discussed above.

In the depicted embodiment, the locking clip 42 has a base 44 that is supported by the abutment area 37 and a hook 46 to interact with and retain the fastening member 38. The hook 46 can be secured over a portion of the fastening member 38 after the fastening member 38 is inserted through the channel 36 provided within the cushion layer 32. The fastening member 38 may or may not extend into the channel 35 provided within the structural member 30.

The fastening member 38 has a retention portion 48 that is retained by the hook 46 of the locking clip 42. In at least one embodiment, the retention portion 48 has a bulbous shape that can be readily retained by the hook 46. The hook 46 and the retention portion 48 may have any suitable shape.

The abutment area 37 is sized to receive the base 44 of the locking clip 42. As shown, the base 44 of the locking clip 42 has dimension of approximately thirty millimeters by forty millimeters. Of course, any suitable size for the base 44 of the locking clip 42 is contemplated within the scope of the present invention.

The abutment area 37 may be recessed within the structural member 30 ten millimeters, which is indicated as A and the structural member 30 has a remaining thickness of approximately twenty-seven millimeters, which is indicated as B. Of course, any suitable amount for both the recessed thickness A and the remaining thickness B is contemplated within the scope of the present invention.

Figure 11:
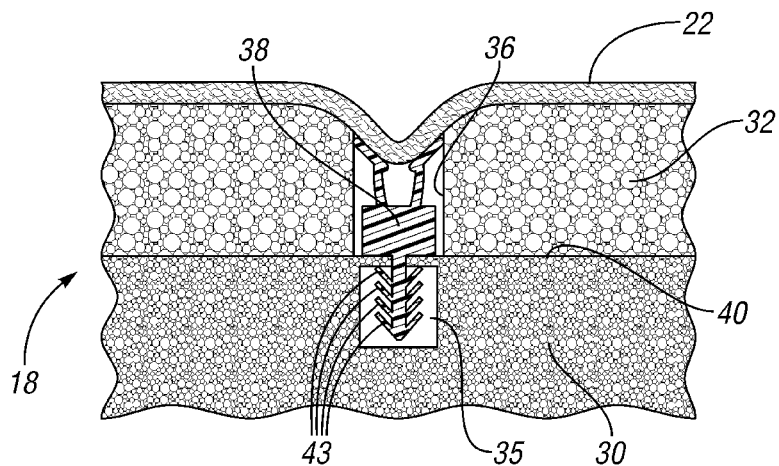
FIG. 11 is a cross-sectional view of a portion of a seat assembly in accordance with another embodiment of the present invention.

With reference now to FIG. 11, an embodiment of the attachment member or locking clip 38 is illustrated. The locking clip 38 is attached to the trim 22 in a suitable manner, as discussed above. The locking clip 38 extends through the channel 36 of the cushion member 32 and into the channel 35 provided within the structural member 30. As illustrated, the locking clip 38 has multiple saw tooth protrusions 43 such the saw tooth protrusions 43 may abut the upper surface of the channel 35 to retain the trim 22 onto the structural member 30 and/or the cushion member 32. Of course, any suitable configuration for the attachment member or locking clip 38 is contemplated within the scope of the disclosed embodiments.

Figure 12:
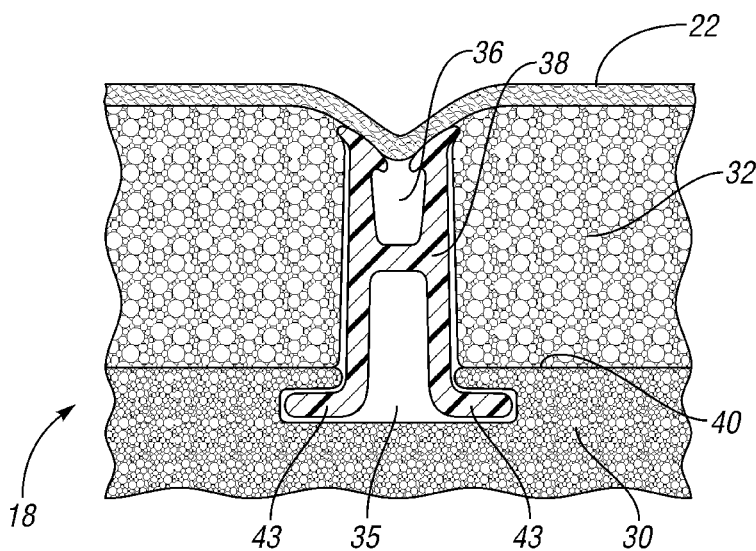
FIG. 12 is a cross-sectional view of a portion of a seat assembly in accordance with another embodiment of the present invention.

Referring now to FIG. 12, another embodiment of the attachment member or locking clip 38 is illustrated. The locking clip 38 is attached to the trim 22 in a suitable manner, as discussed above. The locking clip 38 extends through the channel 36 of the cushion member 32 and into the channel 35 provided within the structural member 30. As illustrated, the locking clip 38 has multiple protrusions 43 that abut the upper surface of the channel 35 to retain the trim 22 onto the structural member 30 and/or the cushion member 32. Of course, any suitable configuration for the attachment member or locking clip 38 is contemplated within the scope of the disclosed embodiments.

Figure 13:
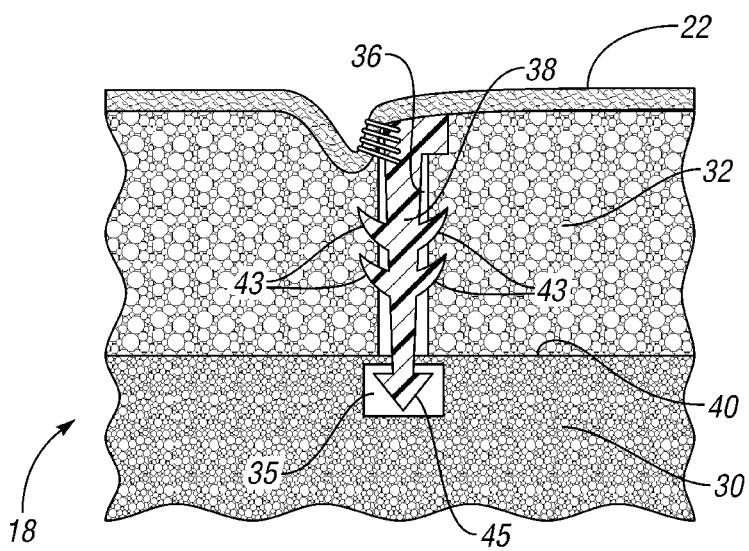
FIG. 13 is a cross-sectional view of a portion of a seat assembly in accordance with another embodiment of the present invention.

In FIG. 13, yet another embodiment of the attachment member or locking clip 38 is illustrated. The locking clip 38 is attached to the trim 22 in a suitable manner, as discussed above. The locking clip 38 extends through the channel 36 of the cushion member 32 and into the channel 35 provided within the structural member 30. As illustrated, the locking clip 38 may have multiple saw tooth protrusions 43 to retain the locking clip 38 within the channel 36 of the cushion member 32. In at least one embodiment, the locking clip 38 has an arrow head protrusion 45 provided on a distal end thereof such the arrow head protrusion 43 may abut the upper surface of the channel 35 to retain the trim 22 onto the structural member 30 and/or the cushion member 32. Of course, any suitable configuration for the attachment member or locking clip 38 is contemplated within the scope of the disclosed embodiments.

Referring now to FIG. 14, the lower seating assembly 18 and the seat frame 14 are illustrated. The lower seating assembly 18 is mountable on the seat frame 14 in any suitable manner, as discussed above.

As depicted, the structural member 30 may be directly mounted to the seat frame 14. In at least one embodiment, the structural member 30 is an anchoring substrate 30. The structural member 30 illustrated, supports an insert region 33. The insert region 33 may include a feature support member 50. The insert region 33 may include a cushion layer 32 and a trim layer 22. As illustrated, the cushion layer 32 and trim layer 22 form a seating area for an occupant. In another embodiment, the insert region 33 does not include both a cushion layer 32 and a trim layer 22 because other features may be utilized to provide features other than a seating area for an occupant. These features for the insert region 33 are discussed further below.

In at least one embodiment, the feature support member 50 is made out of the material that the structural member 30 is made out of, as discussed above.

In at least one embodiment, the insert region 33 does not include the feature support member 50 and can be mounted to the structural member 30 as discussed above. In another embodiment, the trim layer 22 is attached through the cushion layer 32 and the feature support member 50 to the structural member 30 as discussed above.

In the illustrated embodiment, the trim layer 22 and the cushion layer 32 can both be attached to the feature support member 50 so that the insert region 33 is one piece that can be moved by an occupant when not engaged with the structural member 30. The trim layer 22 and the cushion layer 32 may be attached utilizing fasteners or adhesive. Of course, the trim layer 22 and cushion layer 32 may be attached in any suitable manner.

Figure 16:
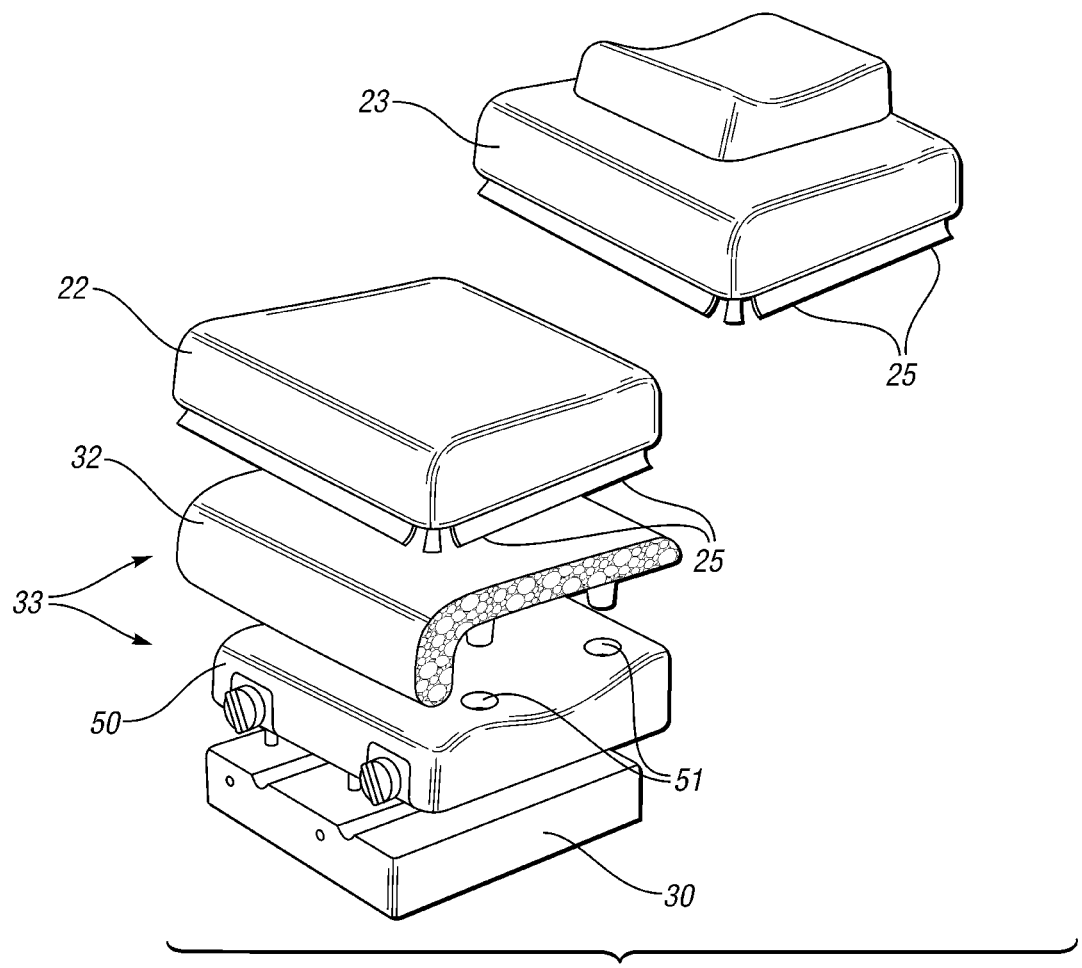
FIG. 16 is a schematic view of a portion of the seat assembly in accordance with an embodiment of the present invention.

With reference to FIG. 16, an embodiment of the lower seat assembly 18 is illustrated. The insert region 33 can be mounted to the structural member 30 via the feature support member 50. The feature support member 50 may have a plurality of location apertures 51 to align protrusions 53 provided on the cushion layer 32. The trim layer 22 can them be mounted over the cushion layer 32.

In another embodiment, an alternate feature member 23 is provided to be mounted directly to the feature support member 50. As discussed below, the alternate feature member 23 may be a child booster seat, a child safety seat, a pet seat, a console, a bin or any other desired feature that can be mounted on the feature support member 50 within the vehicle. As illustrated, the alternate feature member 23 is a booster seat having trim 22 provided thereon to enhance the appearance of the alternate feature member 23. The alternate feature member 23 may be mounted directly or indirectly to the feature support member 50. The cushion layer 32 may or may not be included between the alternate feature member 23 and the feature support member 50.

As shown in the illustrated embodiment, each of the trim layer 22 and the alternate feature member 23 include fasteners 25 to fasten the trim layer 22 or the alternate feature member 23 to the trim (not shown) on the vehicle seat. The fasteners 25 may include but are not limited to hook and eye fabric fasteners, J-clips and snaps.

Figure 15:
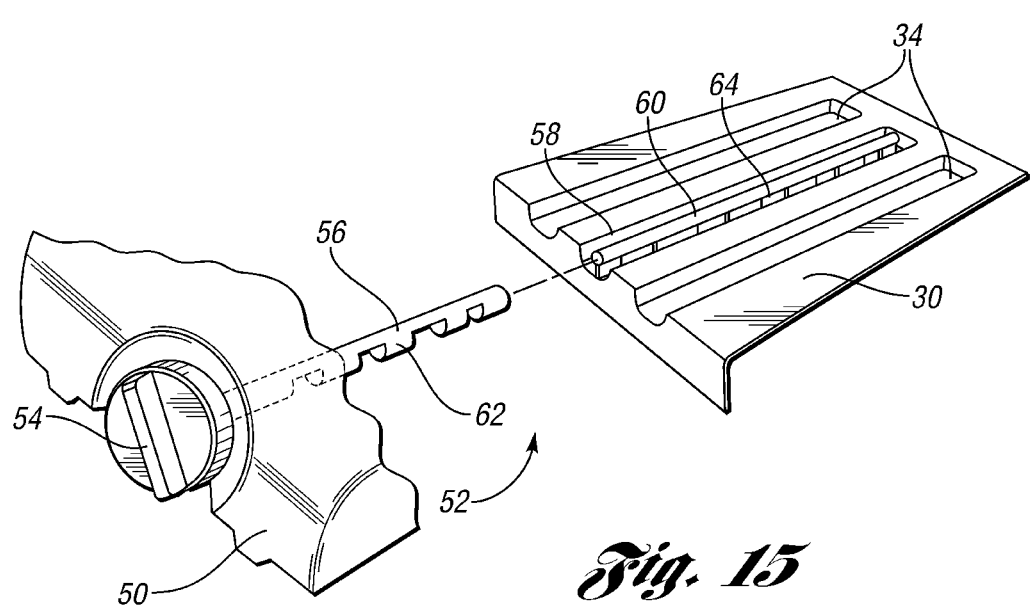
FIG. 15 is a schematic view of a locking feature of an embodiment of the present invention.

Referring again to FIGS. 14 and 15, the insert region 33 may be attached to the structural member 30 with a locking system 52. The locking system 52 may have components on both the insert region 33 and the structural member 30, which is illustrated in FIG. 15. In one embodiment, the locking system 52 includes a key 54 provided on the feature support member 50 to allow the occupant to lock and unlock the locking system 52. The key 54 can rotate and is connected to a locking member 56. The locking member 56 is sized to be received within a channel 58 provided within the structural member 30. The channel 58 may also have a receiving member 60 provided and secured therein. The locking member 56 can be inserted into the channel 58 in the direction indicated by arrow 1 and then rotated by rotation of the key 54 in the direction indicated by arrow 2. The locking member 56 is then engaged with the receiving member 60 to secure the feature support member 50 to the structural member 30. The feature support member 50 can be removed from the structural member 30 by turning the key 54 in the direction opposite arrow 2 and pull the key 54 and locking member 56 in the direction opposite arrow 1.

In at least one embodiment, the locking member 56 has locking teeth 62 while the receiving member 60 has corresponding receiving apertures 64. The receiving apertures 64 are sized to receive the locking teeth 62 and when the key is rotated to lock the locking system 52, the locking teeth 62 are engaged within the receiving apertures 64 to lock the upper feature pad 50 to the structural member 30.

Figure 17:
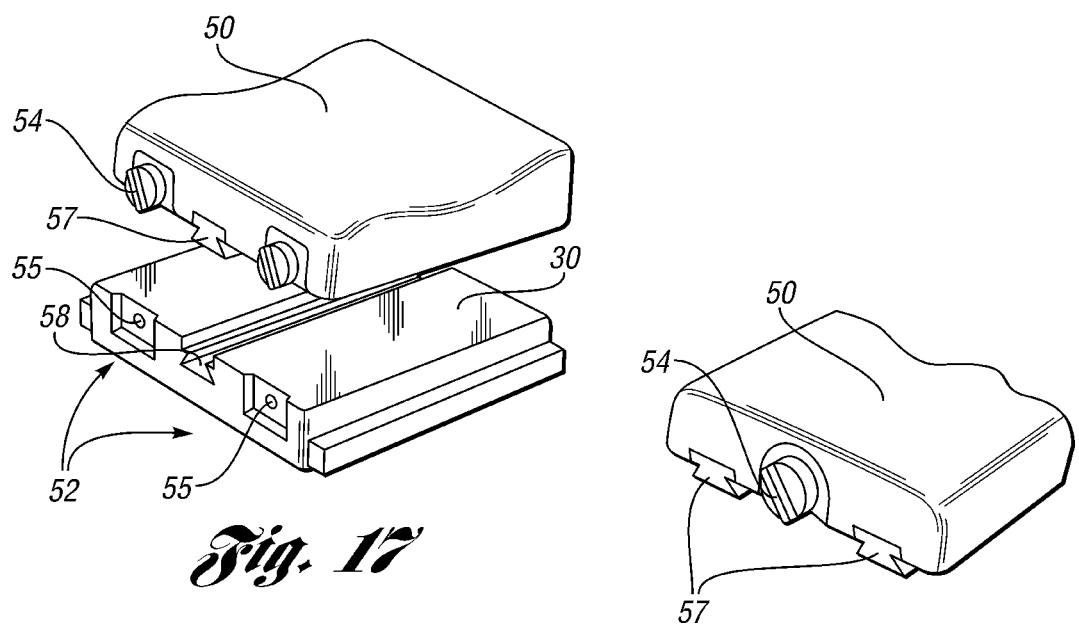
FIG. 17 is an enlarged schematic view of another embodiment of the portion of the seat assembly of FIG. 16.

Another embodiment of the locking system 52 is illustrated in FIG. 17. The locking system 52 illustrated has a key 54 on the feature support member 50 that the occupant can use to lock and unlock the feature support member 50 from the structural member 30. The key 54 hooks into tabs 55 provided on the structural member 30.

The feature support member 50 can be mounted to the structural member 30 by sliding a protrusion 57 provided on the feature support member 50 into a corresponding channel 58 provided on the structural member 30. The protrusion 57 may be integrally molded within the feature support member 50 and the channel 58 may be integrally formed within the structural member 30 or vice versa. Once the feature support member 50 is slid into the structural member 30, a key provided on the feature support member 50 can secure the feature support member 50 to the structural member 30. Since the feature support member 50 can be slid onto the structural member 30, the structural member 30 may have an anti-squeak texture applied thereon to reduce noise created when sliding the feature support member 50 on and off of the structural member 30.

Figure 18:
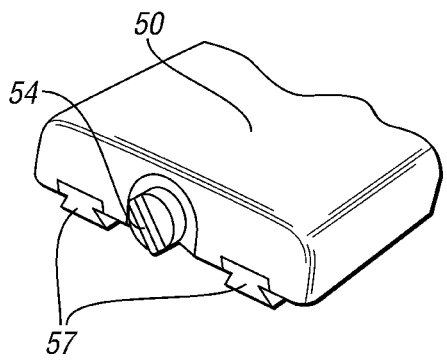
FIG. 18 is a schematic view of a portion of the seat assembly in accordance with an embodiment of the present invention.

In FIG. 18, a portion of another embodiment of the locking system 52 of FIG. 24 is illustrated. The feature support member 50 has a set of two protrusions 57 provided opposite the key 54. As in FIG. 24, the protrusions 57 correspond with channels 58 provided on the structural member 30 and the key 54 locks into a tab 55 provided on the structural member 30.

With reference now to FIG. 19, another embodiment of the lower seat assembly 18 is illustrated. In the depicted embodiment, the structural member 30 is mounted directly into the frame 14 without the use of fasteners. The feature support member 50 can be mounted to the structural member 30 by sliding the protrusion 57 of the feature support member 50 into the channel 58 provided on the structural member 30. Once in place, the locking system 52 can lock the feature support member 50 to the structural member 30. In the depicted embodiment, the locking system 52 is a set of retaining members 59 provided on the structural member 30 and retention members 61 provided on the feature support member 50 or vice versa. The retaining members 59 snap over the retention members 61 to lock the feature support member 50 onto the structural member 30.

As seen in FIG. 20a, the structural member 30 may have a series of channels 58 that have key rods 63 provided therein. The key rods 63 correspond to keyway locks 65 provided within the feature support member 50, as seen in FIG. 21. One channel and a corresponding keyway lock 65 is illustrated in detail in FIG. 20b. The key rods 63 may be integrally molded into the structural member 30 and the keyway locks 65 may be integrally molded into the feature support member 50 or vice versa.

In FIGS. 22-23 another embodiment of the locking system 52 is illustrated. The feature support member 50 can be mounted to the structural member 30, which is clearly illustrated in FIG. 23. The feature support member 50 has a set of two protrusions 57 provided thereon. The protrusions 57 correspond with channels 58 provided on the structural member 30. Additionally, the locking system 54 has a set of retaining members 59 provided on the structural member 30 and retention members 61 provided on the feature support member 50 or vice versa. The retaining members 59 snap over the retention members 61 to lock the feature support member 50 onto the structural member 30.

FIG. 24 depicts another embodiment of the locking system 52. The feature support member 50 can be mounted to the structural member 30. The feature support member 50 has a set of two protrusions 57 provided thereon. The protrusions 57 correspond with channels 58 provided on the structural member 30. Once the feature support member 50 is slid into the structural member 30, fasteners 67 provided with the channels 58 and on the protrusions 57 lock or snap the feature support member 50 to the structural member 30. A latch 69 is provided on the feature support member 50 to further lock the feature support member 50 to the structural member 30. In at least one embodiment, the latch 69 has a handle to facilitate easy installation and removal of the feature support member 50 by the occupant.

Of course, any suitable locking system 54 that can lock and unlock the feature support member 50 to the structural member 30 is contemplated within the scope of the present invention.

With reference now to FIG. 25, an embodiment of the insert region 33 is shown partially mounted on a vehicle seat 10. As illustrated, the insert region 33 may be mounted to the structural member 30 (not depicted) using the feature support member 50, as discussed above. The alternate feature member 23 may be shaped as a bin, as in the present embodiment, to hold various items, such as grocery items depicted. The alternate feature member 23 may have any desired shape that can be mounted within a vehicle.

In at least one embodiment, the alternate feature member 23 has trim 22 mounted to a portion thereof in order to conceal inner components of the vehicle seat 10.

In the depicted embodiment, a cover 66 is provided to be mounted the alternate feature member 23. The cover 66 may be any suitable class-A type surface. The cover 66 may be affixed to the alternate feature member 23 or may be removable from the alternate feature member 23 in any suitable manner.

As illustrated in FIGS. 26 and 27, the alternate feature member 23 can have a console shape to hold various items, such as a purse, folder, cup, bad CDs, music player and/or other items.

Figure 28:
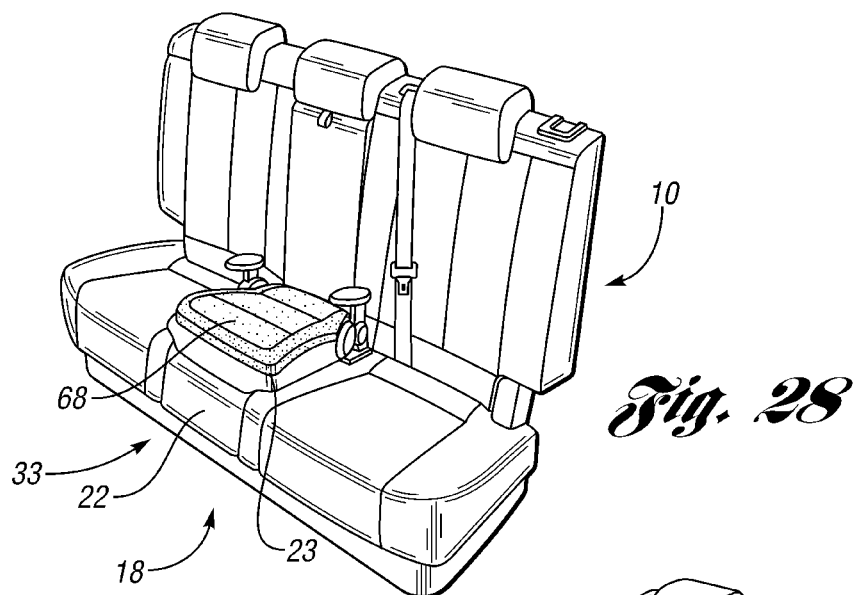
FIG. 28 is a schematic view of another seat assembly in accordance with an embodiment of the present invention.

In FIG. 28, an embodiment of the alternate feature member 23 is shaped as a child seat having a layer of cushioning 68 provided thereon.

Figure 29:
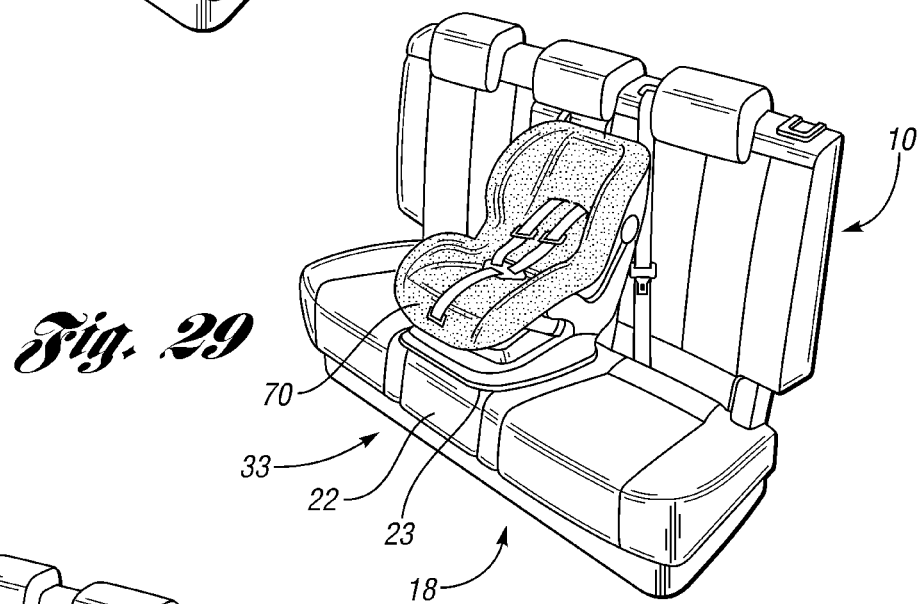
FIG. 29 is a schematic view of a seat assembly in accordance with another embodiment of the present invention.

As illustrated in FIG. 29, the alternate feature member 23 can support a child safety seat 68 so that the alternate feature member 23 and the child safety seat 68 are easily moved in and out of the vehicle as desired by the occupant.

Figure 30:
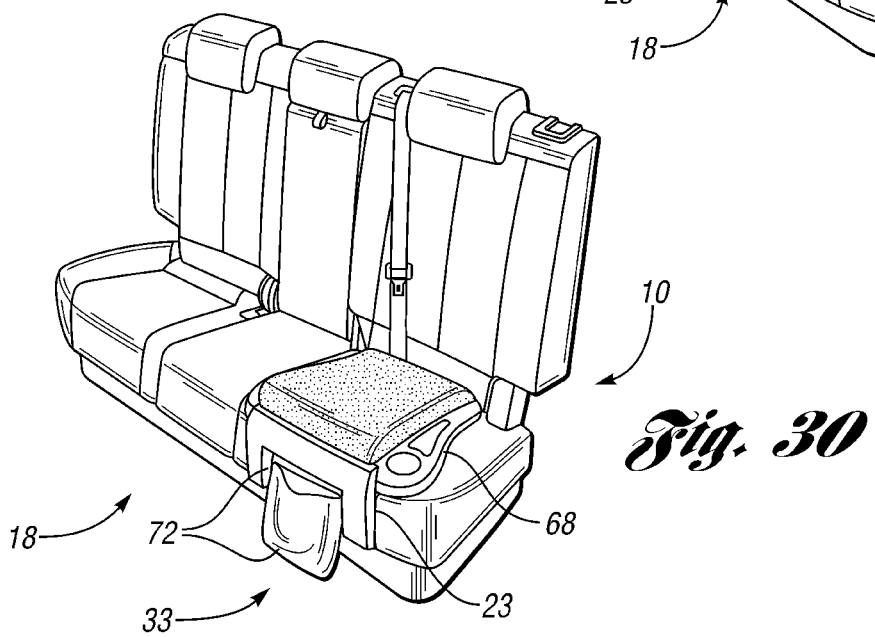
FIG. 30 is a schematic view of a seat assembly in accordance with an embodiment of the present invention.

In FIG. 30, an embodiment of the alternate feature member 23 is shaped as an older child booster seat and has a layer of cushioning 68 provided thereon. The alternate feature member 23 may have features such as hooks 70 provided thereon to allow the occupant to mount bags thereon.

Figure 31:
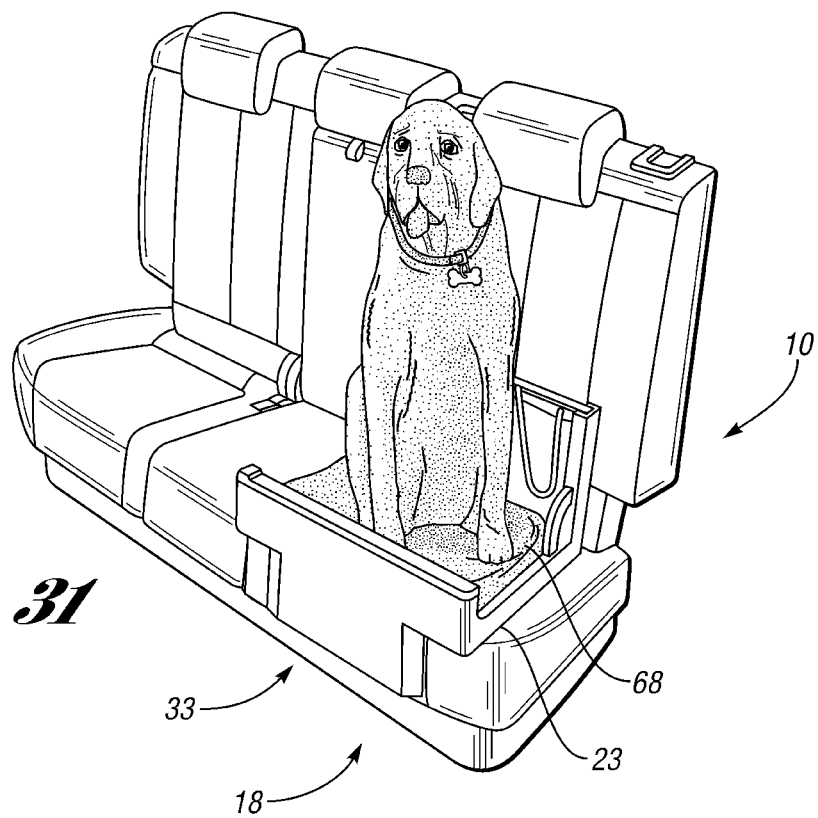
FIG. 31 is a schematic view of a seat assembly in accordance with yet another embodiment of the present invention.
Figure 32:
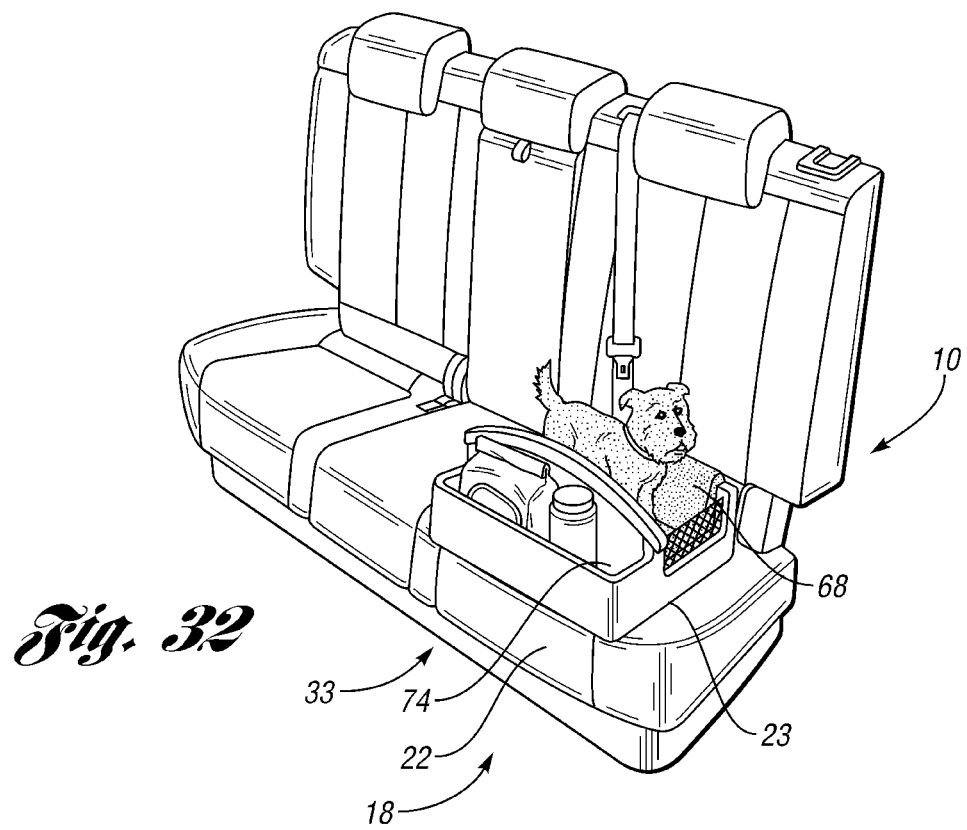
FIG. 32 is a schematic view of a seat assembly in accordance with still another embodiment of the present invention.

As depicted in FIGS. 31 and 32, the alternate feature member 23 can be formed as a pet seat having padding 68 to keep a family pet safe and comfortable. The pet seat 23 may incorporate various features, such as a storage bin 74, as seen in FIG. 32.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat assembly comprising:
   a structural member adapted to be mounted within a vehicle to provide support to an occupant, the structural member having at least one channel formed therein;
   an insert member adapted to be mounted to the structural member; and
   a locking system provided within the at least one channel of the structural member and mounted on the insert member to mount the insert member to the structural member, wherein the locking system comprises:
      at least one retention member provided on the structural member;
      at least one retaining member provided on the insert member to engage the retention member and lock the insert member to the structural member, wherein the at least one retention member is formed as a recess on a peripheral edge of the structural member and the retaining member is positively retained in the recess.

2. The vehicle seat assembly of claim 1 wherein the insert member further comprises a non-seat feature member adapted to be mounted to the insert member.

3. The vehicle seat assembly of claim 1 wherein the insert member further comprises a cushion layer and a trim layer.

4. The vehicle seat assembly of claim 1 wherein the locking system further comprises a locking member mounted to the insert member and a retaining member provided within the at least one channel of the structural member.

5. The vehicle seat assembly of claim 1 wherein the channel has an end opening along a forward edge of the structural member so that a protrusion slides into the channel from the end opening.

6. The vehicle seat assembly of claim 1 wherein the locking system comprises a fastener connected to an inner end wall of the channel opposite the end opening, and wherein the protrusion includes a mating fastener to engage the fastener and lock the insert member to the structural member.

7. A vehicle seat assembly comprising:
   a seat frame;
   a structural member formed of foam and mounted to the seat frame to provide support to an occupant, the structural member having at least one channel formed along an upper surface and having at least one retention member connected to a peripheral surface;
   a feature support member formed of foam having an upper surface to mount a feature member and a lower surface with a protrusion shaped to engage the channel, the feature support member having a retaining member to engage the retention member and lock the feature support member to the structural member;
   wherein the retaining member snaps over the retention member to lock the feature support member onto the structural member.

8. The vehicle seat assembly of claim 7 wherein the feature support member and the structural member are formed of expanded polyolefin (EPO) foam.

9. The vehicle seat assembly of claim 7 wherein the feature support member has an alternate feature member mounted along the upper surface, the alternate feature member comprising at least one of a child booster seat, a child safety seat, a pet seat, a console and a bin.

10. The vehicle seat assembly of claim 9 wherein the alternate feature member has trim mounted to a portion thereof.

11. The vehicle seat assembly of claim 7 wherein the channel has an end opening along a forward edge of the structural member so that the protrusion slides into the channel from the end opening.

12. The vehicle seat assembly of claim 7 further comprising:
two channels formed along the upper surface of the structural member; and
two protrusions shaped to engage the two channels, wherein one protrusion engages one of the two channels.

13. The vehicle seat assembly of claim 12 further comprising a handle disposed on the feature support member between the two protrusions.

14. The vehicle seat assembly of claim 7 wherein the feature support member has a cushion disposed along the upper surface, wherein the cushion is covered with a trim layer to form a seating surface.

15. A vehicle seat assembly comprising:
a seat frame;
a structural member formed of foam and adapted to be mounted to the seat frame to provide support to an occupant, the structural member having at least one channel formed along an upper surface, wherein the channel has an end opening along a forward edge of the structural member so that a protrusion slides into the channel from the end opening;
a feature support member formed of foam having an upper surface to mount a feature member and a lower surface with a protrusion shaped to engage the channel;
a locking system provided to releasably lock the feature support member to the structural member,
wherein the locking system comprises a fastener connected to an inner end wall of the channel opposite the end opening, and wherein the protrusion includes a mating fastener to engage the channel fastener and lock the feature support member to the structural member.

16. The vehicle seat assembly of claim 15 wherein the locking system comprises:
at least one retention member provided on the structural member;
at least one retaining member provided on the feature support member to engage the retention member and lock the feature support member to the structural member.

17. The vehicle seat assembly of claim 16 wherein the at least one retention member is formed as a recess on a peripheral edge of the structural member and the retaining member is positively retained in the recess.

18. The vehicle seat assembly of claim 16 wherein the at least one retention member forms a recessed channel that extends perpendicular to the channel on the structural member and the retaining member is positively retained in the recessed channel.

19. The vehicle seat assembly of claim 15 wherein the at least one protrusion comprises two protrusions, wherein the locking system comprises a latch attached to the feature support member between the two protrusions, the latch engaging a lip disposed on the structural member to lock the feature support member to the structural support member.

20. The vehicle seat assembly of claim 15 further comprising:
two channels formed along the upper surface of the structural member; and
two protrusions shaped to engage the two channels, wherein one protrusion engages one of the two channels.

* * * * *